United States Patent Office 2,761,468
Patented Sept. 4, 1956

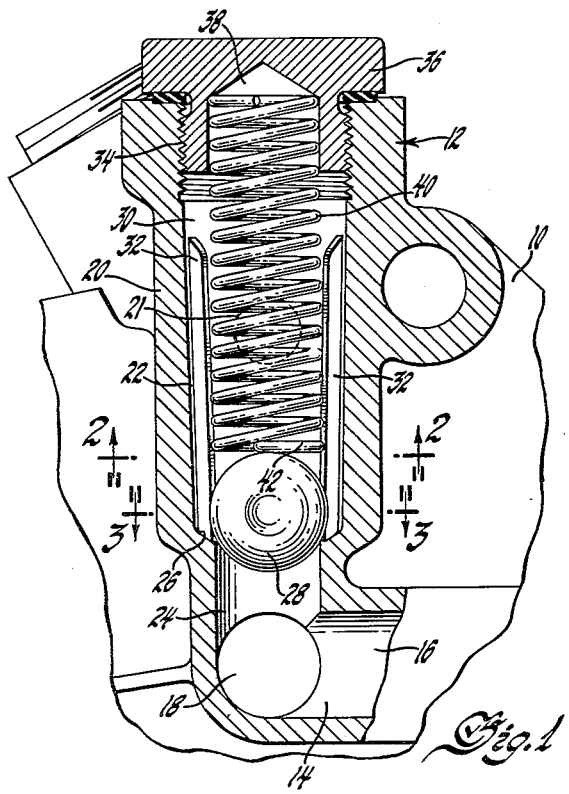

2,761,468

NONCHATTERING FLUID PRESSURE RELIEF VALVE

Russell S. Thatcher, Flint, Mich., assignor to General Motors Corporation, Detroit, Mich., a corporation of Delaware Application June 27, 1951, Serial No. 233,823

8 Claims. (Cl. 137—539)

This invention relates to an improved valve and more particularly to an improved spring actuated pressure relief or by-pass valve.

By-pass valves of this type have been used in automotive oil filter systems to relieve excessive pressure on the filter element. During the normal operation of these spring loaded by-pass valves, the valve member often vibrates or chatters. The undesirable movements accompanying this vibration are generally in a transverse or lateral plane relative to the axis of the valve and spring. Though the cause of this vibration is not clear, it is generally attributed to rapid changes in pressure in the valve passage, or a resonant condition between the natural frequency of the valve member and spring and the natural frequency of the pressure force due to the fluid flow. The vibration or chatter of the valve member is objectionable because it creates a noise and produces excessive wear of the valve member and valve seat. This defect in the conventional spring loaded relief valves may be corrected by forming the end of the valve spring so that it exerts both an axial force and a lateral force on the valve member. It is believed that the lateral force component of the spring and the non-resonant relationship between the forces acting on the valve member, such as the forces of the fluid flowing through the valve and the spring forces, produce the damping action which substantially eliminates vibration and chatter of the valve member. This relationship may be due to the fact that the natural frequency of lateral vibration of the valve member and the spring change as the spring is compressed due to the lateral force component and the fact that the natural frequency of lateral vibration of the fluid forces acting on the valve member and spring assembly change due to the movement of the valve member relative to the seat. It is unlikely that these two changing natural frequencies would change at the same rate. Thus the natural frequency of vibration of the valve member and the flow forces would not coincide for any extended period to cause objectionable vibration.

The primary object of the invention is to provide an improved pressure relief valve wherein there is both an axial and a lateral force exerted on the valve member to return the valve member to its seat and to prevent vibration.

Another object of the invention is to provide in a spring loaded pressure relief valve, a valve spring having a modified form to produce both an axial and a lateral force on said valve member to prevent vibration.

Further objects and advantages of the present invention will be more apparent from the following description and drawings of a preferred embodiment of the invention.

Figure 1 is a partial section of an oil filter housing showing the relief valve.

Figure 2 is a cross-section of Figure 1 on the line 2—2 showing the valve spring end.

Figure 3 is a cross-section of Figure 1 on the line 3—3 showing the valve ball and guides.

Figure 4 is an elevation of the second modified form of valve spring.

Figure 5 is an end view of Figure 4.

Figure 6 is an elevation of the third modified form of valve spring.

Figure 7 is an end view of Figure 6.

Figure 8 is an elevation of the fourth modified form of valve spring.

Figure 9 is an end view of Figure 8.

Figure 10 is an elevation of the fifth modified form of valve spring.

Figure 11 is an end view of Figure 10.

The invention is illustrated in connection with an oil filter housing 10 having a check valve 12. Figure 1 of the drawing shows a portion of the oil filter housing having a check valve 12 located therein. The oil filter housing is provided with a passage 14 for the unfiltered oil flowing under pressure to the filter. The passage 14 has a portion 18 approaching the check valve 12 from the rear. The passage 14 then bends to the right and the portion 16 conducts the unfiltered fluid to the filter element. The passage 14 is connected at this bend to the check valve 12 by the upwardly extending valve bore or passage 24. As the filter becomes plugged with dirt and the inlet pressure increases sufficiently to open the valve, oil flows upwardly from passage 14 through bore 24 past the ball 28 of the valve 12 to the outlet 21. Thus the oil will by-pass the filter and return to the engine in the conventional manner. It will be appreciated that the specific configuration of these passages may be altered to suit various filter housing requirements within the scope of the invention.

The filter valve 12 consists of a generally cylindrical casing 20 having a central bore 22 connected to a fluid pressure passage 14 by means of the reduced bore portion 24. At the end of the reduced bore portion 24 a shoulder 26 is positioned to provide a seat for the valve member of curved surface or valve ball 28. The cylindrical valve bore has an enlarged portion 30 extending upwardly from the shoulder 26. The enlarged portion 30 of the cylindrical passage of the valve body has a plurality and preferably three equally spaced valve guide rails 32.

The top of the valve body 20 has suitable internal threads 34 which receive the threaded cap member 36. The cap member 36 has an internal seat 38 to provide an abutment for the valve spring 40. The valve spring 40 is a conventional coil spring with one end modified to produce a lateral force acting upon the valve ball 28. The details of the last convolution of the valve spring 40 which engages the ball 28 to produce the lateral force component is best shown in Figures 1 and 2. Figure 1 indicates that the last convolution 42 is in a single plane located transverse or at approximately 90° to the axis of the valve spring. Figure 2 shows that in the end view the last convolution 42 is curved inwardly in substantial alignment with a diameter of the coil spring and passes the center of the coil spring slightly offset from the central axis of the coil spring. Figure 2 shows that this convolution 42 curves inwardly just before it approaches the vertical diameter of the coil spring, and then crosses this diameter line to pass the center axis of the coil spring on the opposite side thereof and then curves back symmetrically to cross the vertical diameter line adjacent the other side of the coil spring. This convolution 42 is in a plane tangential to the curved surface of the ball 28 and engages the latter slightly off center and produces the lateral force component which substantially eliminates vibration of the ball valve member.

There are several modified forms of the last convolution of the valve spring which will also produce lateral force components to eliminate vibration of the valve member. Figures 4 and 5 show an end convolution 44 bent across the end of the coil spring 40 and axially of the coil spring. The first half of 46 of the last convolution 44 is bent inwardly just before it crosses the horizontal diameter of the coil spring, and passes the center of the coil spring between the center and the coil. After the last convolution 44 passes the center, it has a portion 48 bent axially away from the coil spring to generally conform with the surface of the ball valve member to be contacted. In another modification shown in Figures 6 and 7, the last convolution 50 has a portion bent substantially in alignment with the diameter of the coil spring. This type of spring member is best used where the ball valve member 28 has sufficient lateral movement to engage one side or the other side of the last convolution 50 and thus create a lateral force component acting on the ball. In the fourth modification shown in Figures 8 and 9, the last convolution 52 is a small circle having a diameter slightly larger than half the diameter of the coil spring. Thus a portion of the last convolution of the coil spring engages the ball valve member 28 just to one side of its center. In the fifth modification illustrated in Figures 10 and 11 the last convolution 54 of the valve member is bent inwardly substantially along a diameter of the coil spring to a point just beyond the center of the coil spring where it terminates. The end portion 56 of the last convolution 54 is bent upwardly adjacent the center of the coil spring and inwardly into the coil spring so that the end of the last convolution does not engage the ball valve member 28 but that an intermediate portion of the last convolution 54 engages the ball valve member and at a point displaced from the center of the ball.

Since in all of these modifications the terminal convolutions of the spring 40 engages the valve member 28 eccentrically, there is a lateral force component applied to the valve member 28. This force will tend to damp any vibration in the valve member due to the fact that it acts against the vibration forces. This exceptional elimination of vibrations due to resonance between the various forces of the valve spring and the fluid flow may be attributed to the fact that these forces tend to vary differently with the position of the ball and the compression of the spring when the eccentric spring is used.

The slight taper of the ball valve guides is merely to provide draft so that the body may be die cast. This taper is not significant in the small vertical distance that the valve moves.

It will be appreciated that the above described embodiments of the invention are illustrative of the various features of the invention, and that many modifications of the invention may be made within the scope of the appended claims.

I claim:

1. In a valve structure, the combination of a casing member having a passage, a valve seat in said passage, a valve ball reciprocally positioned in said passage for seating on said valve seat, means supported on said casing to guide said valve ball, a coil spring having one end engaging said valve ball, means on said casing anchoring the other end of said coil spring, the first mentioned end of said coil spring being bent inwardly to cross the axis of said coil spring and eccentrically engage the valve ball to produce an axial force and a lateral force to substantially eliminate vibration of the valve ball.

2. In a valve structure, the combination of a casing member having a passage, an annular shoulder formed in the side wall of said passage to provide a valve seat, a valve member with a curved surface reciprocally positioned in said passage for seating on said valve seat, means supported on the passage walls to guide said valve member, a coil spring having one end engaging said curved surface at a point nearly in alignment with the axis of said spring, means on said casing anchoring the other end of said coil spring, the first mentioned end of said coil spring being bent inwardly to cross the axis of said coil spring and engage the valve member to produce an axial force and a lateral force to substantially eliminate vibration of the valve member.

3. In a valve structure, the combination of a casing member having a passage, an annular shoulder formed in the side wall of said passage to provide a valve seat, a valve ball reciprocally positioned in said passage for seating on said valve seat, means supported on the passage walls to guide said valve ball, a coil spring having one end engaging said valve ball, means on said casing anchoring the other end of said coil spring, the first mentioned end of said coil spring being bent inwardly to cross the axis of said coil spring in the plane of the end convolution and eccentrically engage the valve ball to produce an axial force and a lateral force to substantially eliminate vibration of the valve ball.

4. In a valve structure, the combination of a casing member having a passage, an annular shoulder formed in the side wall of said passage to provide a valve seat, a valve ball reciprocally positioned in said passage for seating on said valve seat, means supported on the passage walls to guide said valve ball, a coil spring having one end engaging said valve ball, means on said casing anchoring the other end of said coil spring, the first mentioned end of said coil spring being bent inwardly to cross the axis of said coil spring and terminating in a portion extending away from the main body of the spring and engaging the valve ball eccentrically thereof to produce an axial force and a lateral force to substantially eliminate vibration of the valve ball.

5. In a valve structure, the combination of a casing member having a passage, an annular shoulder formed in the side wall of said passage to provide a valve seat, a valve ball reciprocally positioned in said passage for seating on said valve seat, means supported on the passage walls to guide said valve ball, a coil spring having one end engaging said valve ball, means on said casing anchoring the other end of said coil spring, the first mentioned end of said coil spring being bent inwardly to cross the axis of said coil spring and terminating in an end portion extending into the spring from and engaging the valve ball eccentrically thereof to produce an axial force and a lateral force to substantially eliminate vibration of the valve ball.

6. In a valve structure, the combination of a casing member having a passage, an annular shoulder formed in the side wall of said passage to provide a valve seat, a valve ball reciprocally positioned in said passage for seating on said valve seat, means supported on the passage walls to guide said valve ball, a coil spring having one end engaging said valve ball, means on said casing anchoring the other end of said coil spring, the first mentioned end of said coil spring being bent inwardly to form a coil having a diameter slightly more than half the diameter of the coil spring to cross the axis of said coil spring and engaging the valve ball eccentrically thereof to produce an axial force and a lateral force to substantially eliminate vibration of the valve wall.

7. A fluid pressure relief valve comprising a casing member having a passage formed therein, an annular shoulder on said member forming a valve seat, a valve member with a curved surface in said passage and adapted to engage said seat to close said passage, a coil spring under compression and interposed between a portion of said casing member and said valve member, and one end portion of said spring extending toward the axis of the spring and tangentially and eccentrically engaging the said curved surface.

8. A fluid pressure relief valve comprising a casing member having a passage and an annular shoulder formed therein, said shoulder constituting a valve seat, a valve ball in said passage and adapted to engage said seat to close said passage, a coil spring under compression and interposed between one portion of said casing member and said ball valve, an end portion of said spring extending toward and eccentrically and tangentially engaging the latter, the said passage having a diameter larger than the diameter of either said spring or said ball valve to accommodate fluid flow, and said spring and ball valve engagement being such that vibration of the ball valve is substantially eliminated when the latter is acted upon by fluid pressure.

References Cited in the file of this patent

UNITED STATES PATENTS

| | | |
|---|---|---|
| 851,358 | Kiesselbach | Apr. 23, 1907 |
| 1,220,872 | Meyer | Mar. 27, 1917 |
| 1,704,152 | Stephens et al. | Mar. 5, 1929 |
| 1,773,726 | Deming | Aug. 26, 1930 |
| 1,854,280 | Summers | Apr. 19, 1932 |
| 1,896,706 | Grimes | Feb. 7, 1933 |
| 1,912,093 | Parsons | May 30, 1933 |
| 2,103,673 | Hoferer | Dec. 28, 1937 |
| 2,572,816 | Patrick | Oct. 23, 1951 |

FOREIGN PATENTS

| | | |
|---|---|---|
| 337,339 | Great Britain | Oct. 30, 1930 |
| 194,840 | Germany | Feb. 4, 1908 |
| 197,057 | Switzerland | July 1, 1938 |